United States Patent [19]
Dealey, Jr. et al.

[11] Patent Number: 6,152,586
[45] Date of Patent: Nov. 28, 2000

[54] CARGO AREA LIGHTING SYSTEM FOR TRUCKS

[75] Inventors: Onward K. Dealey, Jr., Waterford; Ben V. Domas, Oakland; Alvin D. McCauley, Holly, all of Mich.

[73] Assignee: Transmatic, Inc., Waterford, Mich.

[21] Appl. No.: 09/239,123

[22] Filed: Jan. 28, 1999

[51] Int. Cl.[7] .................................................. B60Q 1/00
[52] U.S. Cl. .................. 362/485; 362/551; 362/559; 362/581; 362/459
[58] Field of Search ................................ 362/551, 559, 362/581, 459, 485

[56] References Cited

U.S. PATENT DOCUMENTS

| | | |
|---|---|---|
| 2,101,748 | 12/1937 | Michel et al. . |
| 2,587,807 | 3/1952 | Arenberg et al. ................ 362/379 |
| 4,740,870 | 4/1988 | Moore et al. . |
| 4,811,172 | 3/1989 | Davenport et al. . |
| 4,947,293 | 8/1990 | Johnson et al. . |
| 5,050,047 | 9/1991 | Viner et al. . |
| 5,122,933 | 6/1992 | Johnson . |
| 5,184,883 | 2/1993 | Finch et al. . |
| 5,483,427 | 1/1996 | Dealey, Jr. et al. . |
| 5,495,400 | 2/1996 | Currie . |
| 5,678,914 | 10/1997 | Dealey et al. . |
| 5,982,969 | 11/1999 | Sugiyama et al. ................ 385/123 |

FOREIGN PATENT DOCUMENTS

| | | |
|---|---|---|
| 976524 | 11/1964 | United Kingdom . |

OTHER PUBLICATIONS

Parmley Robert O.; Standard Handbook of Fastening and Joining, 2nd Edition; 1989 Mc Graw–Hill; p. 2–2, seciton 2–1, paragraph 3.

*Primary Examiner*—Thomas M. Sember
*Assistant Examiner*—Ismael Negron
*Attorney, Agent, or Firm*—Reising, Ethington, Barnes, Kisselle, Learman & McCulloch, P.C.

[57] ABSTRACT

A lighting system using piped light is provided for a compartment such as the cargo space of a truck. An electrically energized light source is mounted adjacent the compartment. A side-fire light pipe is optically coupled to the light source. An elongated light pipe enclosure is disposed around and supports the light pipe. The enclosure comprises an elongated mounting flange adapted to fasten the enclosure to a compartment inner surface, an elongated face panel that extends integrally from along the length of the mounting flange, and a longitudinal elongated channel that is recessed into the face panel. The channel includes parallel opposing channel edges that define a longitudinal gap in the face panel. The channel is configured to receive the light pipe in frictional engagement through the gap. The light pipe can be inserted into the channel after the enclosure has been installed and protects the light pipe from damage during such operations as cargo loading into and cargo unloading from the compartment.

29 Claims, 4 Drawing Sheets

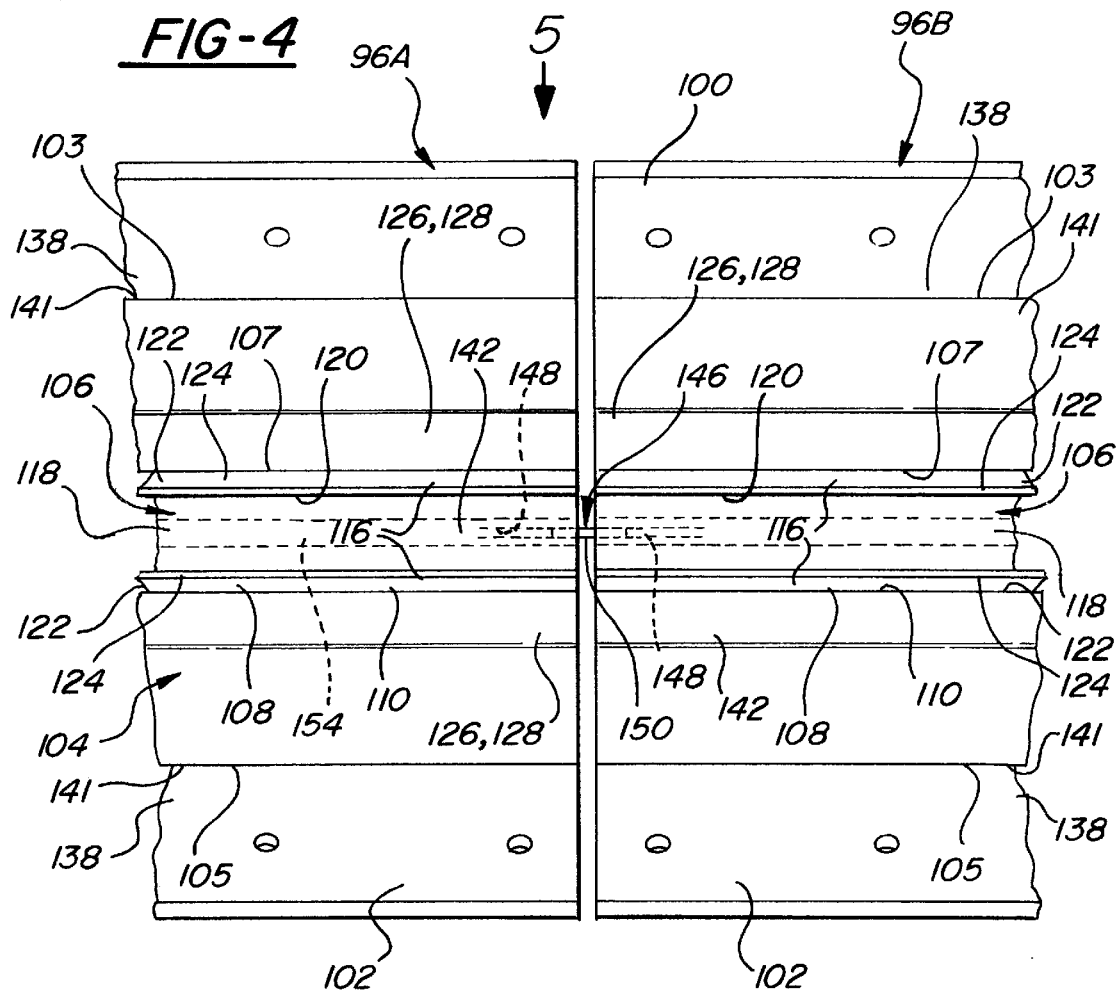
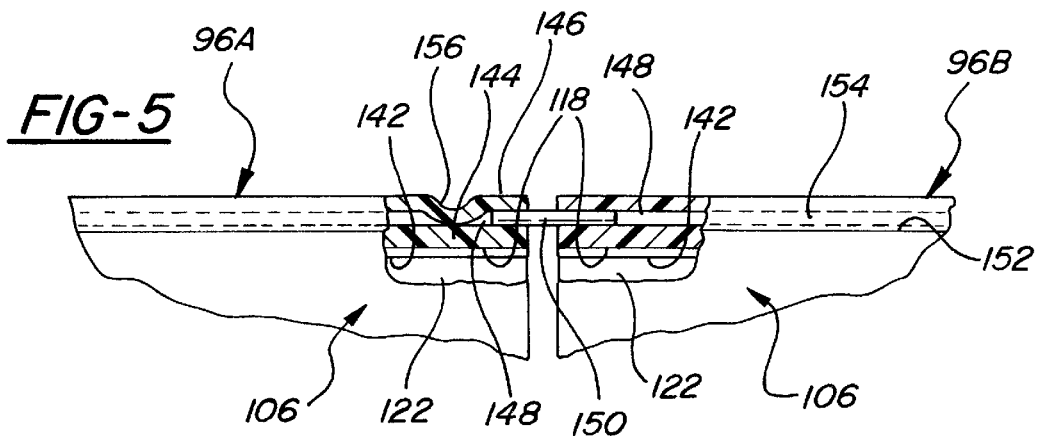

CARGO AREA LIGHTING SYSTEM FOR TRUCKS

FIELD OF THE INVENTION

This invention relates to truck lighting systems; more particularly, it relates to a lighting system for the cargo handling area of a truck using piped light.

BACKGROUND OF THE INVENTION

As is well known, trucks that have container bodies with enclosed cargo spaces often include lighting systems that illuminate the cargo spaces while personnel are loading and unloading cargo. Especially in the case of long haul trucks, truck bodies tend to be long relative to their height and width. Given height and width constraints imposed by bridge clearances and lane widths, respectively, length is the only cargo space dimension that can be increased to provide desired cargo capacity. The longstanding practice in lighting the interior of truck cargo spaces has been to mount a plurality of incandescent lamps in the cargo space roof and to space the lamps from each other from front to rear. Such lighting fixtures sometimes comprise a lamp housing recessed into the roof and enclosing an incandescent lamp and having a light distributing lens disposed on the housing between the housing and the cargo space so it is generally flush with the interior surface of the roof. This arrangement provides the required illumination without the light fixture intruding into the cargo space.

Conventional incandescent lighting systems of the type described above have been found to be unsatisfactory for use in truck cargo spaces because they waste energy, require excessive maintenance and are sometimes used in a way that creates a fire hazard. In addition, incandescent lamps generate a significant amount of heat. In refrigerated trucks, i.e. trucks that have refrigeration systems for cooling the cargo space, incandescent lamps transfer the heat that they generate into the refrigerated cargo space. The heat from the incandescent lamps therefore works against the refrigeration system, requiring more energy to maintain a given temperature. In addition, it is known that some truck drivers like to increase the illumination in the cargo space by replacing the standard low wattage incandescent lamps with higher wattage lamps. The higher wattage lamps give off more heat and do not last as long. This practice adds to bulb replacement cost. The conventional incandescent lighting system can constitute a fire hazard when used in a truck body loaded with flammable cargo—especially when such cargo is stacked up close to the incandescent lamp fixtures and the lights are inadvertently left on for a long time. Such conditions can cause truck fires that are not only dangerous to life and limb but also constitute increased costs to the trucking industry because of loss and increased insurance premiums.

There has been a longstanding need in the trucking industry for a safe, effective and energy efficient lighting system for the cargo space in a container body of a truck.

In the prior art, certain fiber optic or "light pipe" systems have been proposed for use on vehicles. For example, the Johnson et al. U.S. Pat. No. 4,947,293 granted Aug. 7, 1990 discloses a clearance lighting system for a semi trailer cargo container body. The lighting system includes a core light conducting material in the form of an elongated light conducting strip provided with a cladding material to provide a light guide. The core and cladding are constructed to provide lateral light emission as well as longitudinal propagation. A light source is adapted to end-illuminate the light guides for both sides of a container body from a single light source. A similar system that also provides a message panel is disclosed in Johnson U.S. Pat. No. 5,122,933 granted Jun. 16, 1992.

The Moore et al. U.S. Pat. No. 4,740,870 granted Apr. 26, 1988 describes a fiber optic lighting system for boats. In this system, a plurality of fiber optic cables extends from a central light source to respective plurality of remote light fixtures to provide lighting at different locations on the boat.

The Davenport et al. U.S. Pat. No. 4,811,172 granted Mar. 7, 1989 describes an optical fiber lighting system particularly suited for automobiles and aircraft. The lighting system comprises subsystems suitable for high and low beam illumination and rear illumination of an automobile. Each subsystem comprises a high intensity light source coupled to one end of each of a plurality of light pipes with each having their other end positioned relative to a reflective element and a lens. The reflective elements are arranged to provide a prescribed illumination pattern.

The Finch et al. U.S. Pat. No. 5,184,883 granted Feb. 9, 1993 discloses an automobile lighting system similar to that described in the above-referenced Davenport U.S. Pat. No. 4,811,172. The Finch et al. patent describes an indicating device that comprises a shutter having an opaque portion, a light blocking position in which the opaque portion blocks the passage of light from the output end of a light guide to a lens and a non-blocking position in which light is allowed to pass through the indicating device to the lens.

U.S. Pat. No. 5,495,400 discloses an optical fiber device that discloses the use of light pipes to illuminate exterior auto body parts such as the sides of pickup and flat-bed trucks and the rear of semi-tractor trailers. One embodiment discloses a holder configured to support a light pipe on top of the side rails of a pickup truck bed. The holder includes a flat elongated base portion that connects to the top of a side rail and a longitudinal arcuate race or channel. The race has a continuous C-shaped cross section and is configured to receive a light pipe in frictional engagement. The race is made of a rigid, optically transmissive material. The race protrudes integrally upward from along the base portion so that the race, and any light pipe engaged within the race, are supported in an upwardly-projected position exposed to repeated contact with cargo during loading, transport and unloading.

A fiber optic cargo area lighting system for trucks disclosed in U.S. Pat. No. 5,483,427, assigned to the assignee of the present invention. This patent discloses a light source mounted on the truck body and plural lighting fixtures mounted to the roof of the truck body. Each lighting fixture receives light that is piped through a separate light pipe from the source to the fixture. Two sets of lighting fixtures are disposed in linear arrays extending along a line from the front to the rear of the truck body. The light pipes for one set of lighting fixtures are all disposed within a first enclosure and the light pipes for the other set of lighting fixtures are all disposed within a second enclosure. Certain sections of the enclosures have transparent lenses and certain light pipes within the enclosures emit side light through those lenses. A lighting fixture at the rear door of the truck body has an optical switch for turning the lighting fixture on or off.

Another fiber optic cargo area lighting system for trucks is disclosed in U.S. Pat. No. 5,678,914. This patent, also assigned to the assignee of this application, also discloses a truck cargo space lighting system that includes light pipes mounted in the cargo space. As described in the previous patent, each light pipe is optically coupled to an electrically energized light source and transmits light from the light source to an output end while emitting light laterally along its length. An elongated light pipe enclosure is disposed around and supports the light pipe. The enclosure comprises a mounting flange adapted to fasten the enclosure to the floor, the side walls, the front and rear walls and/or the roof of the cargo space. The enclosure includes a light-transmitting panel disposed between the light pipe and the cargo space to transmit laterally-emitted light from the light pipe into the cargo space. The light transmitting panel comprises an elongated conduit for supporting the light pipe along its length. The light transmitting panel is formed into an elongated tubular shape defining the elongated conduit. The conduit includes an elongated longitudinally oriented slot for receiving the light pipe in force-fit snap-in engagement along its length. Each enclosure comprises at least two elongated segments disposed end-to-end, the light pipe extending through both segments. Each segment is integrally extruded from a single piece of the light transmissive material. The light pipe includes a cladding with an index of refraction that causes the cladding to emit light laterally thereof. The lighting system includes an end mirror disposed adjacent the light pipe output end, the mirror positioned to reflect light from the output end back into the light pipe. Because each enclosure comprises only a single piece of extruded plastic, this system is easy to manufacture. However, the enclosure segments of the lighting system disclosed in the '914 patent require that a light pipe be installed in the conduit portions of the segments before the segments and light pipe can be installed in a truck cargo space.

What is needed is an improved lighting system for the cargo space of a truck that is easier to install and that protects illuminating elements from damage due to cargo loading, unloading and shifting in transport.

SUMMARY OF THE INVENTION

In accordance with this invention, an improved lighting system is provided for an enclosed space or compartment such as the cargo space of a truck body. The lighting system includes an elongated light pipe enclosure having an outwardly-opening channel configured to receive a light pipe in frictional engagement through an elongated gap. This allows the light pipe to be inserted into place within the channel after the enclosure has been installed but protects the light pipe from damage during cargo loading, transport and unloading. The channel allows for thermal expansion and contraction of the light pipe and keeps the light pipe straight for improved light transmission.

The enclosure also comprises an elongated mounting flange adapted to fasten the enclosure to one of the inner surfaces of the compartment. Extending integrally from along the length of the mounting flange is an elongated face panel. The channel is recessed in the face panel. The channel includes parallel opposing channel edges that define the longitudinal gap in the face panel.

According to another aspect of the invention, the mounting flange includes a flat mounting surface configured to lie flush against a first surface of the compartment that the enclosure is to be mounted on. The mounting flange supports the face panel in a diagonal orientation relative to the mounting flange mounting surface so that the enclosure can be mounted in the cove as a cove trim piece with the face panel spanning the cove area.

According to another aspect of the invention, the enclosure includes a second mounting flange that integrally extends from along an edge of the face panel opposite the first mounting flange. The second mounting flange includes a flat mounting surface configured to lie flat against a second inner surface of the compartment generally perpendicular to the first inner surface of the compartment. This allows the face panel to be supported from along both edges and allows the enclosure to be fastened into and along a corner of the compartment.

According to another aspect of the invention, the enclosure comprises an ear extending integrally outward from an inside surface of the channel and extending laterally along the first channel edge. The ear is configured and positioned to engage and aid in retaining the light pipe within the channel.

According to another aspect of the invention, the enclosure comprises a second elongated ear extending integrally outward from the inside surface of the channel and extending laterally along the second channel edge. The second ear is configured and positioned to engage and aid in retaining the light pipe within the channel. The second ear is disposed opposite and parallel to the first ear. The first and second ears define an elongated longitudinal slot configured to receive the light pipe in force-fit snap-in engagement along its length.

According to another aspect of the invention, the first and second ears comprise flat elongated panels that extend outward from respective elongated bases to respective distil edges. The respective distil edges and bases are parallel to one another with the respective distil edges being spaced closer together than the respective bases. This configuration helps to hold a light pipe within the channel and allows the channel to accept and retain a relatively wide range of light pipe diameters.

According to another aspect of the invention, the mounting flange, face panel, channel and ear are integrally formed as a single unitary piece from a rigid polymeric material.

According to another aspect of the invention, the face panel includes a pair of elongated beveled surfaces longitudinally flanking the channel. The beveled surfaces are beveled inwards such that the channel is recessed further into the face panel to provide additional protection for the light pipe while minimizing obstruction of light emitted from the light pipe.

According to another aspect of the invention, the enclosure comprises a liner panel receptacle configured to receive an edge of a liner panel to be disposed against a compartment inner surface. The enclosure may also include a second liner panel receptacle. The receptacles may be formed into the respective first and second mounting flanges with the face panel extending diagonally between the receptacles. The receptacles allow the enclosure to help support compartment liner panels on the inner surfaces of the compartment.

According to another aspect of the invention, the enclosure comprises an elongated reflective surface extending along a portion of the inner surface of the channel. The reflective surface redirects light into the compartment that is laterally emitted from a light pipe toward the channel.

According to another aspect of the invention, the reflective surface comprises a layer of metal that may be applied in the form of a metal tape.

According to another aspect of the invention, the enclosure comprises at least two elongated segments disposed end-to-end. The light pipe extends through both segments.

According to another aspect of the invention, the lighting system includes an interconnecting linkage between the abutting segments. The interconnecting linkage is configured to prevent relative movement between the face panels of the abutting segments to prevent the face panel of one of the segments from being displaced inwardly relative to the face panel of the other segment as a light pipe is pressed into engagement within the channels of the abutting segments.

According to another aspect of the invention, the interconnecting linkage includes a pin receptacle in each of the abutting segments. Each pin receptacle is configured and positioned to coaxially align with the pin receptacle of the abutting segment. A pin is coaxially disposed within and extends through at least a portion of both the two pin receptacles.

According to another aspect of the invention, the pin receptacle of each segment comprises a hollow tubular rib integrally extending from along a back outer surface of the channel of each segment. The tubular rib of one segment includes a blockage at a point adjacent an end of the rib—such as a collapsed portion of the rib. The blockage is configured to prevent further axial inward movement of the pin and leave a portion of a length of the pin protruding from the end of the rib. The pin is supported in this way so that the tubular rib of a second segment can be slid over the exposed length of the pin without pushing the full length of the pin into the tubular rib of the first segment as the second segment is mounted in a position abutting the first segment.

According to another aspect of the invention, the lighting system may include an electrical energizing circuit that extends from a compartment electrical system to the light source. A switch is electrically connected in the circuit and is operable to turn the light source on and off.

A complete understanding of this invention may be obtained from the detailed description that follows taken with the accompanying drawings.

DESCRIPTION OF THE DRAWINGS

FIG. 4 is a broken-out view of two adjacent enclosures of the embodiments of FIGS. 1 and 2 longitudinally separated to expose an interconnecting pin of the lighting system;

FIG. 5 is a fragmentary, partially cut-away view of the two adjacent enclosures of FIG. 4 taken in the direction of arrow 5 of FIG. 4.

BEST MODE FOR CARRYING OUT THE INVENTION

Figure 1:
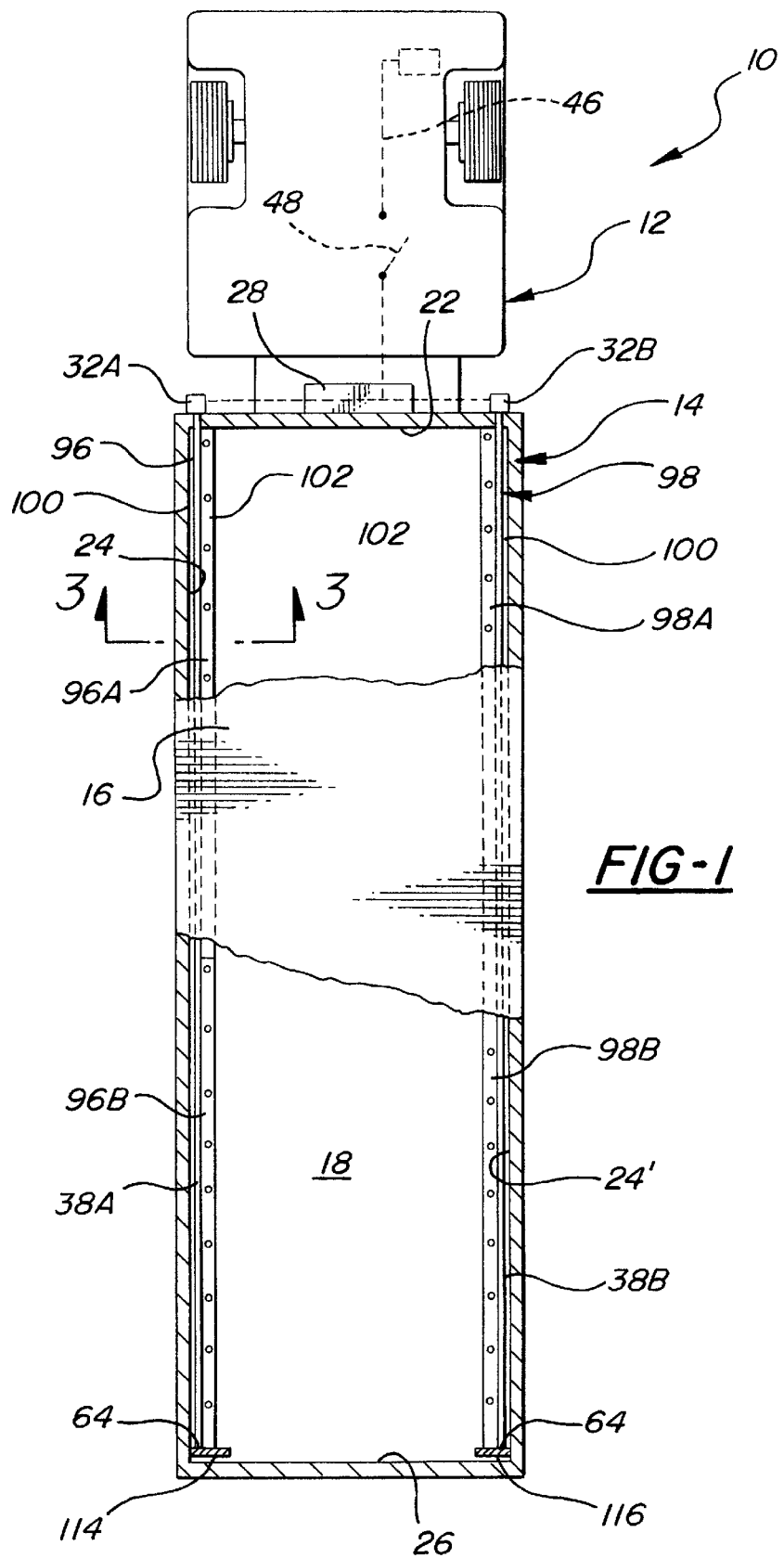
FIG. 1 is a partially cut-away cross-sectional schematic plan view of a third embodiment of the lighting system.

Referring now to the drawings, there is shown an illustrative embodiment of the invention in a truck body interior lighting system using piped light. It will be appreciated as the description proceeds that the invention may be used in other applications and may be realized in different embodiments.

FIG. 1 shows a trailer truck, generally shown at 10, having a cab and a truck body, generally indicated at 12 and 14, respectively. The truck body includes a floor 16, a roof 18, a front wall 22, sidewalls 24 and 24' and a rear wall 26. The truck body 14 encloses a compartment in the form of a cargo space that is refrigerated by a refrigeration unit 28.

Figure 2:
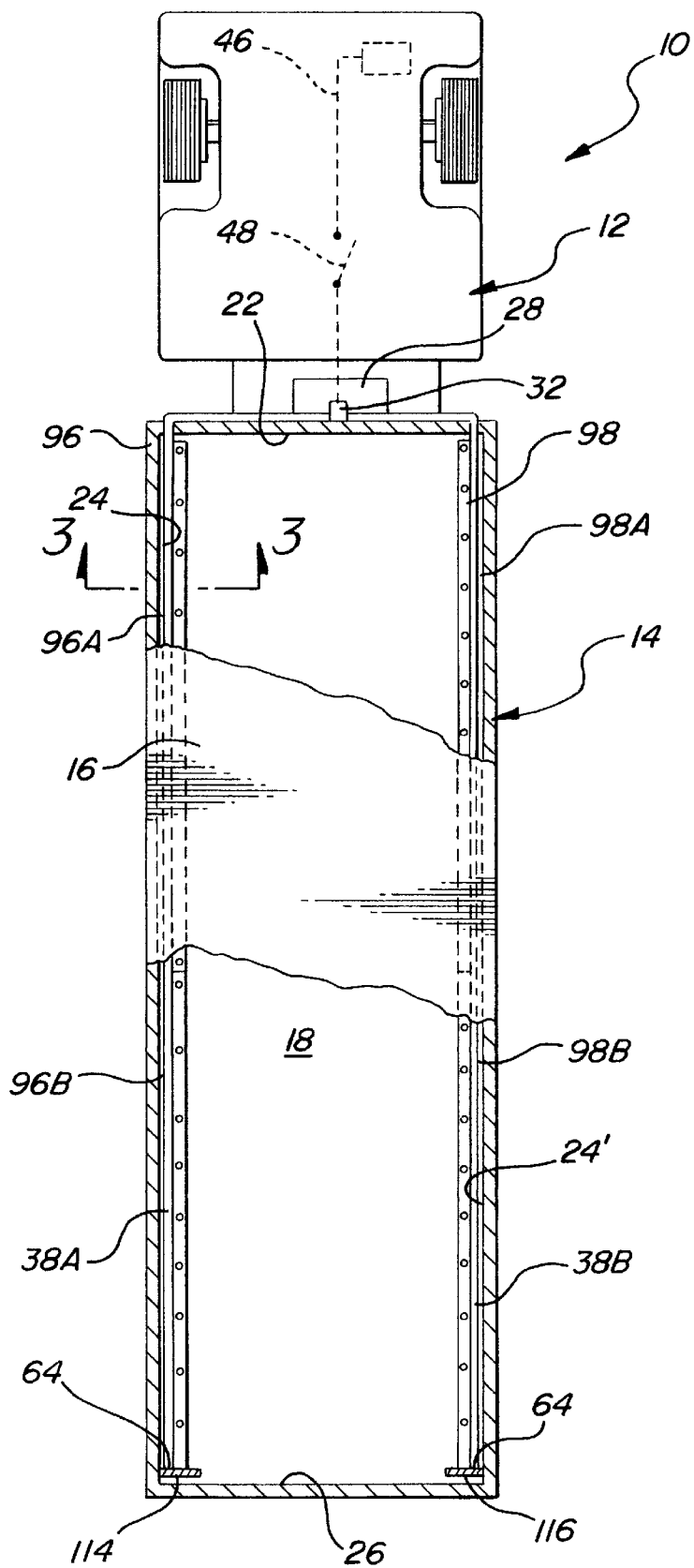
FIG. 2 is a partially cut-away cross-sectional schematic plan view of an alternative installation of the third embodiment of the lighting system.

As shown in FIG. 2, the lighting system for the cargo space, in accordance with this invention, comprises at least one light source 32 suitably mounted on the exterior of the front wall 22 above the refrigeration unit 28. A first embodiment of the lighting system, shown in FIG. 1, comprises two light sources 32A, 32B mounted on the exterior of the front wall 22 on either side of the refrigeration unit 28. A second embodiment of the lighting system, shown in FIG. 2, comprises a single light source 32 mounted on the exterior of the front wall 22 above the refrigeration unit 28. In other embodiments, the light source or sources may be mounted in any one of a number of suitable locations on the vehicle, e.g., either inside or outside the cargo space, above or below the refrigeration unit. Further, both the first and the second embodiments of the lighting system comprise two light pipes 38A, 38B, each of which extends from the light source to a point adjacent the rear wall 26. Both the first and the second embodiments also include a pair of light pipe enclosures, generally indicated at 96 and 98, respectively, which each contains a single light pipe. The enclosure 96 includes enclosure segments 96A and 96B and the enclosure 98 includes enclosure segments 98A and 98B. The first embodiment of FIG. 1 shows enclosures 96 and 98 extending from two separate light sources, 32A and 32B, respectively. The second embodiment of FIG. 2 shows enclosure 96 extending from the same light source 32 as enclosure 98.

The aforementioned components of the lighting system will now be described in detail.

The light source 32 (32A and 32B in the second embodiment) comprises a high intensity lamp of the type described in the Robbins et al. U.S. Pat. No. 4,704,660 granted Nov. 3, 1987. Such light sources are available from General Electric Company and Lumenyte International Corporation. Light sources of this type are commonly known as "light engines". The light source 32 is provided with a plurality of light ports each of which is adapted for optical coupling with a light pipe in a well-known manner. A light source is energized from the truck electrical system through an electrical conductor 46 which includes a manually actuable switch 48 mounted in the cab for operation by the driver. The light source includes a voltage inverter for developing a high voltage alternating current supply from the low voltage DC supply from the truck. The light source may alternatively be energized from a separate cargo compartment electrical system such as an electrical system associated with an air conditioning system for a refrigerated cargo space.

The light pipes 38A and 38B are light conductors of the type constructed of polymeric material with a suitable cladding. The light pipes are preferably of the type known as solid core semi-rigid fiber optics such as that described in Zarian U.S. Pat. No. 4,957,347 granted Sep. 18, 1990. Such light pipes are available from the Lumenyte International Corporation. The light pipes are commonly referred to individually as an "optic". The preferred light pipe for this invention is of a type identified as side-light fiber optic because it has the property of emitting light radially through the cladding around the core and also conducts light axially for emission through the end of the core (referred to herein as a side-fire/end-fire light pipe). It will be understood that the lighting system of the first embodiment of this invention may also use light pipes extending between the light source and selected ones of the end-fire light fixtures which do not provide side light emission but instead emit light only from the output end (referred to herein as end-fire light pipes).

Each of the light pipes has an input end and an output end, the input end being optically coupled with one of the ports of the light source.

Figure 3:
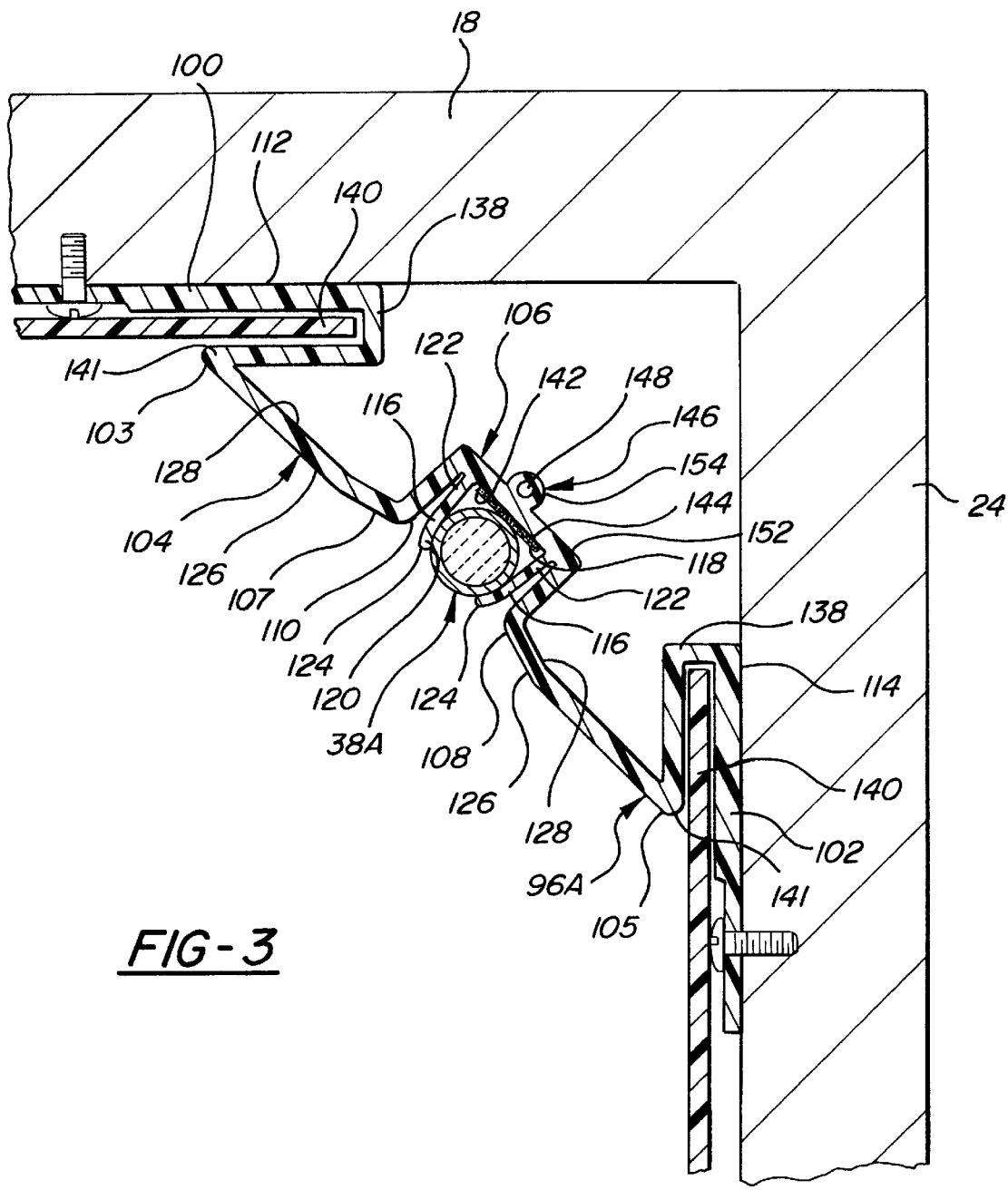
FIG. 3 is a cross-sectional view of an enclosure of the embodiments of FIGS. 1 and 2 taken along line 3—3 of either FIG. 1 or FIG. 2.

As shown in FIGS. 1, 2 and 3, the elongated light pipe enclosures 96, 98 of the first and second embodiments are each disposed around and support one of the light pipes 38A, 38B. Each enclosure 96, 98 is formed in two elongated, approximate 12 foot segments 96A, 96B, 98A, 98B. The segments are disposed end-to-end in pairs, with a single light pipe 38A, 38B extending through each pair.

All of the first and second embodiment enclosure segments 96A, 96B, 98A, 98B are of the same construction. Accordingly, description of only enclosure 96A will suffice and will be given with reference to FIG. 3.

As is best shown in FIG. 3, the light pipe enclosure segment 96A of the first and second embodiments includes a pair of elongated mounting flanges 100, 102 adapted to fasten each enclosure segment into one of the coves or upper corners formed where the side walls 24, 24' and roof 18 meet. In other embodiments the mounting flanges may be configured to fasten the enclosure segment 96A to other cargo space interior surfaces.

Enclosure segment 96A is extruded as a single piece of polymeric material to have an elongated shape of a uniform cross-section along its length. An opaque material such as white polyvinyl chloride (PVC) is preferred, but may, in other embodiments, be replaced by a light transmissive material. White PVC is preferred for its ability to help reflect and diffuse light emitted from the light pipe 38A passing through the enclosure segment 96A.

Supported between the mounting flanges 100, 102 is an elongated face panel generally indicated at 104 in FIGS. 3 and 4. The mounting flanges 100, 102 integrally extend from along opposite side edges 103, 105 of the face panel 104 so that the face panel 104 is supported from along both side edges 103, 105. A longitudinal elongated rectangular channel, generally indicated at 106 in FIGS. 3–5, is recessed in the face panel 104. The channel 106 has a continuous U-shaped cross section and includes parallel opposing channel edges 107, 108 that define a longitudinal gap 110 in the face panel 104. The channel 106 is configured to receive the light pipe 38A in frictional engagement through the gap 110 to allow the light pipe 38A to be inserted into place within the channel 106 after the enclosure segment 96A has been installed.

Each mounting flange 100, 102 includes a flat mounting surface shown at 112, 114 in FIG. 3. The mounting surfaces 112, 114 are disposed perpendicular to one another so as to lie flush against the two intersecting, perpendicular cargo space inner surfaces that the enclosure segment 96A is to be mounted on, i.e., the surfaces disposed on the side wall 24 and the roof 18. The mounting flanges 100, 102 support the face panel 104 in a diagonal orientation relative to the mounting flange mounting surfaces 112, 114. This configuration allows the enclosure segment 96A to be mounted in a cove area in much the same manner as a cove trim piece.

The enclosure segment 96A comprises a pair of elongated ears shown at 116 in FIGS. 3–5. The ears 116 extend integrally outward from an inside surface 118 of the channel 106 and that also extend laterally, parallel to and adjacent the respective channel edges 107, 108. The ears 116 are also disposed opposite and parallel to one another within the channel 106 and define an elongated longitudinal slot 120 disposed in the same approximate plane as the channel edges 107, 108. The slot 120 is wide enough to receive the light pipe 38A in force-fit snap-in engagement along its length. The ears 116 are sufficiently flexible to allow them to engage and aid in retaining the light pipe 38A within the channel 106.

As best shown in FIGS. 3 and 4, the first and second ears 116 comprise flat elongated panels that extend outward from respective elongated bases 122 to respective distil edges 124. The respective distil edges 124 and bases 122 are parallel to one another. The panels converge toward each other when in a relaxed state with the respective distil edges 124 being spaced closer together than the respective bases 122. The distance between the distil edges 124 is less than a diameter of the light pipe 38A to be received into the channel 106 through the slot 120. Therefore, when a light pipe is forced into the channel 106 through the slot 120, the ears 116 move to a spread position in which the distil edges 124 are forced outward and then snap back inward toward the relaxed position, holding the light pipe 38A within the channel 106.

The mounting flanges 100, 102, face panel 104, channel 106 and ears 116 are integrally formed as a single unitary piece from polyvinyl chloride through extrusion.

The face panel 104 includes a pair of elongated beveled surfaces shown at 126 in FIGS. 3 and 4. The beveled surfaces 126 longitudinally flank the channel 106. In other words, the beveled surfaces 126 run alongside the channel 106 on respective opposite sides of the channel 106. The beveled surfaces are beveled inwards in such a way that the channel 106 is recessed further into the face panel 104. The beveled surfaces 126 are disposed on beveled portions of the face panel 104 shown at 128 in FIGS. 3 and 4.

The enclosure segment 96A comprises a pair of liner panel receptacles 138 formed into the mounting flanges 100, 102 and configured to receive respective edges of plastic liner panels 140 to be disposed against the respective cargo space inner surfaces that the enclosure segment 96A is mounted to. As best shown in FIG. 3, the receptacles 138 appear in cross section as rectangular channels formed into the mounting flanges 100, 102. The face panel 104 extends diagonally between upper edges 141 of the respective receptacles 138.

The enclosure segment 96A comprises an elongated reflective surface shown at 142 in FIGS. 3–5. The reflective surface 142 is disposed on and extends along a portion of the inside surface 118 of the channel 106. The reflective surface 142 comprises a layer of metal 144 applied in the form of adhesive metal tape. However, in other embodiments the metal layer 144 may be applied by any one of a number of metalization processes known in the art.

As is best shown in FIGS. 1 and 2, each enclosure 96 includes at least two elongated enclosure segments 96A, 96B disposed end-to-end and abutting one another. The light pipe 38A extends through both segments 96A, 96B.

The lighting system includes an interconnecting linkage, generally indicated at 146 in FIGS. 3–5, disposed between the abutting segments 96A, 96B.

The interconnecting linkage 146 is configured to prevent relative movement between the face panels 104 of the abutting segments 96A, 96B. More specifically, the linkage 146 prevents the face panel 104 of one of the segments 96A from being displaced inwardly relative to the face panel 104 of the other segment 96B as a light pipe is pressed into engagement within the channels 106 of the abutting segments 96A, 96B. If the face panels 104 of the two segments 96A, 96B are not secured together in this way, as a light pipe is snapped into the channel 106 along one of the segments 96A, it begins to press inwardly against the distal edges of the ears 116 of the other segment 96B. This causes the face panel 104 of the other segment 96B to flex inwardly, making it quite difficult to snap the light pipe 38A through the slot 120 and into the channel 106 of the other segment 96B.

The interconnecting linkage 146 includes a pin receptacle, shown at 148 in FIGS. 3–5 disposed in each of the abutting segments 96A, 96B. The pin receptacle 148 of each enclosure segment 96A is configured and positioned to coaxially align with the pin receptacle 148 of the abutting enclosure segment 96B. A pin 150 is coaxially disposed within and connects the two pin receptacles 148.

As is best shown in FIGS. 3 and 4, the pin receptacle 148 of each enclosure segment 96A, 96B comprises a hollow tubular rib 154 integrally extending from along the entire length of a back outer surface 152 of the channel 106 of each enclosure segment 96A, 96B. The pin 150 is generally cylindrical in shape and has a diameter generally equal to an inner diameter of the receptacles 148. However, in other embodiments the pin 150 may have a diameter slightly greater than the inner diameter of the receptacles 148 to provide an interference fit between pin 150 and at least one of the receptacles 148. In addition, other embodiments may include ribs 154 that, rather than extending the entire length of their respective enclosure segments, extend only a sufficient distance along their respective enclosure segment to accommodate a pin.

The tubular rib 154 of one enclosure segment 96A includes a blockage shown at 156 in FIG. 5. The blockage 156 is formed into the rib 154 at a point adjacent an end of the rib 154. The blockage 156 comprises a collapsed portion of the rib 154 formed by crimping or heat fusion. The blockage 156 is configured to prevent further axial inward movement of the pin and to leave a portion of a length of the pin 150 protruding from the end of the rib 154. This is so that the tubular rib 154 of another enclosure segment 96B can be slid over the exposed length of the pin 150 without pushing the full length of the pin 150 into the tubular rib 154 of enclosure segment 96A as the enclosure segment 96B is mounted in a position abutting segment 96A.

The light pipes 38A, 38B of the first and second embodiments are of the same construction. Accordingly, description of only light pipe 38A will suffice and will be given with reference to FIGS. 1–3.

Light pipe 38A includes a cladding with an index of refraction that causes the cladding to emit light laterally. An end mirror 114 is disposed at the output end 64 of light pipe 38A. The mirror 114 is positioned perpendicular to the central longitudinal axis of light pipe 38A.

To operate the lighting system, the truck driver operates the electrical switch 48 to turn on the lighting system to illuminate the cargo space in the truck body. When the switch 48 is turned on the light sources 32A, 32B are energized and emit light from respective ports to the input ends of the light pipes Each light pipe 38A, 38B conducts light along its length while emitting light laterally through its respective enclosure segments 42A, 42B, 44A, 44B into the cargo space. Light that is not laterally emitted is conducted to the output end 64 of each light pipe 38A, 38B and is reflected back into each light pipe 38A, 38B by mirrors 114, 116 so that no light is lost from the output ends 64.

Although the description of this invention has been given with reference to a particular embodiment, it is not to be construed in a limiting sense. Many variations and modifications will now occur to those skilled in the art. For a definition of the invention reference is made to the appended claims.

We claim:

1. A lighting system for a compartment such as the cargo space of a truck, the compartment enclosed by compartment inner surfaces such as a floor, side walls, front and rear stalls and a roof, the lighting system comprising an elongated light pipe enclosure for supporting a light pipe, the enclosure comprising:

an elongated mounting flange configured to mount the enclosure on an inner surface of a compartment to be illuminated;

an elongated face panel extending integrally from along the length of the mounting flange; and a longitudinal elongated channel recessed in the face panel and including parallel opposing channel edges defining a longitudinal gap in the face panel, the channel being configured to receive a light pipe through the gap, the channel being opened to open toward an interior of a compartment defined by an inner surface that the enclosure is fastened to so that a light pipe can be installed in the enclosure alter the enclosure has been mounted.

2. A lighting system as set forth in claim 1 in which:

the mounting flange includes a flat mounting surface configured to lie flush against a first compartment inner surface that the enclosure is to be mounted on; and the mounting flange supports the face panel in a diagonal orientation relative to the mounting flange mounting surface.

3. A lighting system as set forth in claim 2 in which the enclosure includes a second mounting flange that integrally extends from along an edge of the face panel opposite the first mounting flange.

4. A lighting system as set forth in claim 3 in which the second mounting flange includes a flat mounting surface configured to lie flat against a second compartment inner surface generally perpendicular to the first compartment inner surface.

5. A lighting system as set forth in claim 1 in which the enclosure comprises an elongated ear extending integrally outward from an inside surface of the channel and extending laterally along the first channel edge, the ear configured and positioned to engage and aid in retaining a light pipe within the channel.

6. A lighting system as set forth in claim 5 in which the enclosure comprises a second elongated ear extending integrally outward from the inside surface of the channel and extending laterally along the second channel edge, the second ear configured and positioned to engage and aid in retaining the light pipe within the channel, the second ear disposed opposite and parallel to the first ear, the first and second ears defining an elongated longitudinal slot configured to receive the light pipe in force-fit snap-in engagement along its length.

7. A lighting system as set forth in claim 6 in which the first and second ears comprise flat elongated panels that extend outward from respective elongated bases to respective distil edges, the respective distil edges and bases being parallel to one another, the respective distil edges being spaced closer together than the respective bases.

8. A lighting system as set forth in claim 5 in which the mounting flange, face panel, channel and ear are integrally formed as a single unitary piece from a rigid polymeric material.

9. A lighting system as set forth in claim 1 in which the face panel includes a pair of elongated beveled surfaces longitudinally flanking the channel on respective opposite sides of the channel, the beveled surfaces being beveled inwards such that the channel is recessed further into the face panel.

10. A lighting system as set forth in claim 3 in which the enclosure comprises a liner panel receptacle configured to receive an edge of a liner panel to be disposed against a compartment inner surface.

11. A lighting system as set forth in claim 10 in which the enclosure comprises a second liner panel receptacle configured to receive an edge of a second liner panel, the receptacles formed into the respective first and second mounting flanges to receive liner panels oriented perpendicular to one another, the face panel extending diagonally between the receptacles.

12. A lighting system as set forth in claim 1 in which the enclosure comprises an elongated reflective surface extending along a portion of an inner surface of the channel.

13. A lighting system as set forth in claim 12 in which the reflective surface comprises a layer of metal.

14. A lighting system as set forth in claim 12 in which the reflective surface comprises metal tape adhered to the inner surface of the channel.

15. A lighting system as set forth in claim 1 in which the enclosure comprises at least two abutting elongated segments disposed end-to-end, the light pipe extending through both segments.

16. A lighting system as set forth in claim 15 in which the lighting system includes an interconnecting linkage between the abutting segments configured to prevent relative movement between the face panels of the abutting segments.

17. A lighting system as set forth in claim 16 in which the interconnecting linkage includes:
   a pin receptacle in each of the abutting segments, each pin receptacle configured and positioned to coaxially align with the pin receptacle of the abutting segment; and
   a pin coaxially disposed within the two pin receptacles.

18. A lighting system as set forth in claim 17 in which the pin receptacle of each segment comprises a hollow tubular rib integrally extending from along a back outer surface of the channel of each segment.

19. A lighting system as set forth in claim 18 in which the tubular rib of one segment includes a blockage at a point adjacent an end of the rib, the blockage configured to prevent further axial inward movement of the pin and leave a portion of a length of the pin protruding from the end of the rib.

20. A lighting system as set forth in claim 19 in which the blockage comprises a collapsed portion of the rib.

21. A lighting system as set forth in claim 1 in which the enclosure is integrally extruded from a single piece of polymeric material.

22. A lighting system as set forth in claim 21 in which the enclosure is integrally extruded from a single piece of polyvinyl chloride.

23. A lighting system as set forth in claim 1 in which the light pipe includes a cladding with an index of refraction that causes the cladding to emit light laterally thereof.

24. A lighting system as set forth in claim 23 in which the light pipe output end is adapted to emit light from the output end and the lighting system includes an end mirror disposed adjacent the light pipe output end, the mirror positioned to reflect light from the output end back into the light pipe.

25. A lighting system as set forth in claim 1 including an electrical energizing circuit extending from the cab to the light source; and a switch electrically connected in the circuit and operable to turn the light source on and off.

26. A lighting system as set forth in claim 25 including:
   an electrical energizing circuit extending from a compartment electrical system to the light source; and
   a switch electrically connected in the circuit and operable to turn the light source on and off.

27. A lighting system for a truck of the type having a cab for a vehicle driver and having a truck body for cargo, the body having a cargo space enclosed by cargo space inner surfaces including a floor, side walls, front and rear walls and a roof, the lighting system comprising:
   an electrically energized light source mounted on the truck body;
   a light pipe having an input end and an output end and being adapted to transmit light received at the input end to the output end, the light pipe adapted to emit light laterally along its length, the light pipe input end being optically coupled to the light source for receiving light therefrom; and
   an elongated light pipe enclosure disposed around and supporting the light pipe, the enclosure comprising:
      an elongated face panel configured to fasten to a cargo space inner surface; and
      a longitudinal elongated channel recessed in the face panel and including parallel opposing channel edges defining a longitudinal gap in the face panel, the channel being configured to receive the light pipe in frictional engagement through the gap.

28. A lighting system as set forth in claim 27 in which the enclosure comprises an elongated ear extending integrally outward from an inside surface of the channel and extending laterally along and adjacent one of the channel edges, the ear configured and positioned to engage and aid in retaining the light pipe within the channel.

29. A lighting system as set forth in claim 28 in which the enclosure comprises a second elongated ear extending integrally outward from the inside surface of the channel and extending laterally along the other of the channel edges, the second ear configured and positioned to engage and aid in retaining the light pipe within the channel, the second ear disposed opposite and parallel to the first ear, the first and second ears defining an elongated longitudinal slot configured to receive the light pipe in force-fit snap-in engagement along its length.

* * * * *

UNITED STATES PATENT AND TRADEMARK OFFICE
CERTIFICATE OF CORRECTION

PATENT NO. : 6,152,586  Page 1 of 1
DATED : November 28, 2000
INVENTOR(S) : Onward K. Dealey, Jr.

It is certified that error appears in the above-identified patent and that said Letters Patent is hereby corrected as shown below:

<u>Column 9,</u>
Line 50, after "light pipes" insert therein -- 38A and 38B --
Line 66, after "rear" delete "stalls" and insert therein -- walls --

<u>Column 10,</u>
Line 15, after "channel being" delete "opened" and insert therein -- oriented --
Line 18, after "enclosure" delete "alter" and insert therein -- after --

<u>Column 12,</u>
Line 36, after the words "engagement through the gap", insert the words -- , the channel being oriented to open toward an interior of a compartment defined by the inner surface that the enclosure is fastened to --.

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,152,586
DATED         : November 28, 2000
INVENTOR(S)   : Onward K. Dealey, Jr.

It is certified that error appears in the above-identified patent and that said Letters Patent is hereby corrected as shown below:

Column 9,
Line 50, after "light pipes" insert therein -- 38A and 38B --

Column 10,
Line 1, after "rear" delete "stalls" and insert therein -- walls --
Line 15, after "channel being" delete "opened" and insert therein -- oriented --
Line 18, after "enclosure" delete "alter" and insert therein -- after --

Column 12,
Line 36, after the words "engagement through the gap", insert the words -- , the channel being oriented to open toward an interior of a compartment defined by the inner surface that the enclosure is fastened to --.

This certificate supersedes Certificate of Correction issued August 19, 2003.

Signed and Sealed this

Eleventh Day of November, 2003

JAMES E. ROGAN
*Director of the United States Patent and Trademark Office*